Sept. 15, 1964 T. A. CARTER ETAL 3,149,254
LINEAR MOTOR OR GENERATOR
Filed Aug. 7, 1961
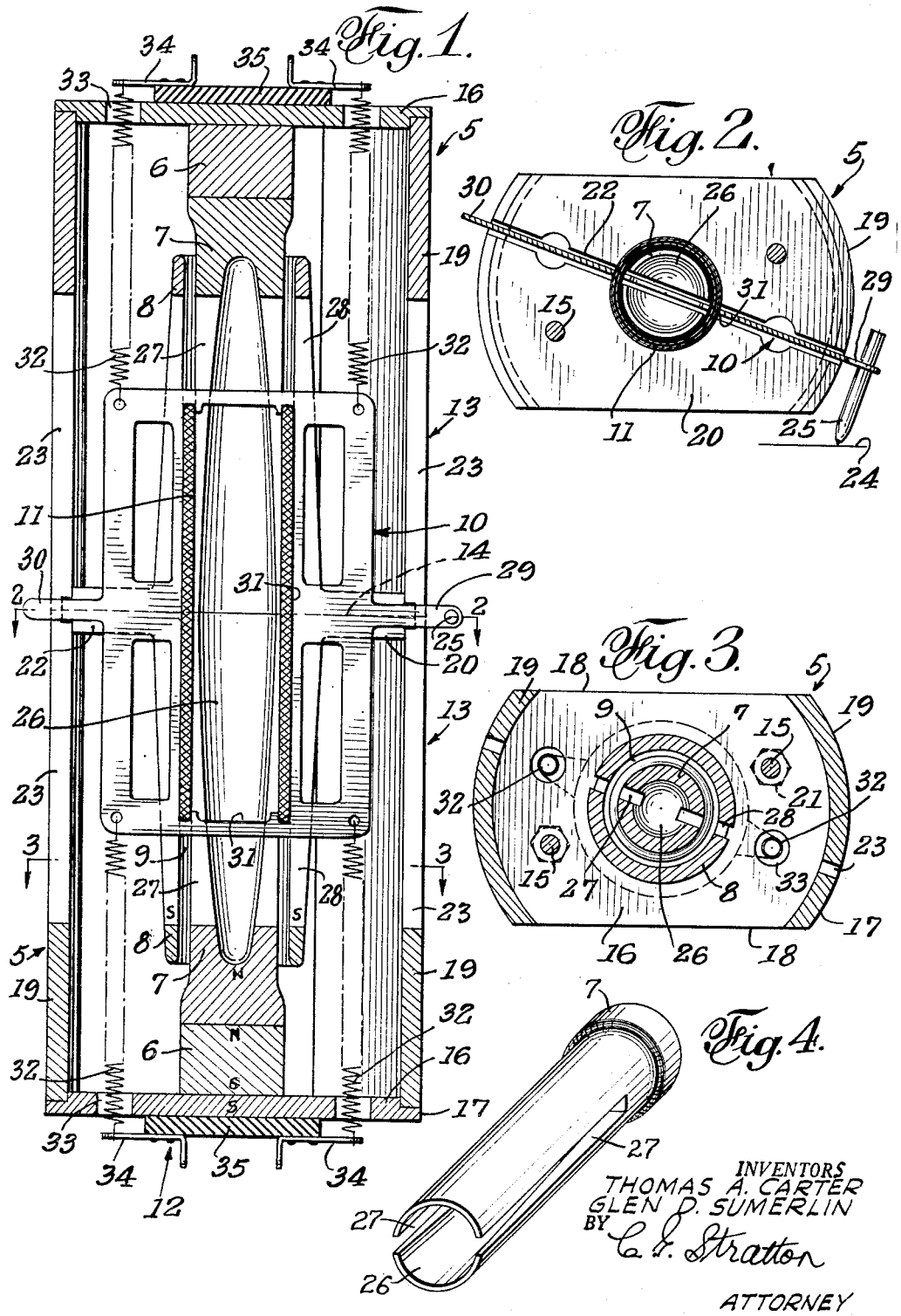
INVENTORS
THOMAS A. CARTER
GLEN D. SUMERLIN
BY C. F. Stratton
ATTORNEY

3,149,254
LINEAR MOTOR OR GENERATOR
Thomas A. Carter, 7914 Melita Ave., North Hollywood, Calif., and Glen D. Sumerlin, 13606 Kismet, Sylmar, Calif.
Filed Aug. 7, 1961, Ser. No. 129,831
8 Claims. (Cl. 310—12)

This invention relates to a linear motor-generator, the same comprising an electrical device in which a coil operates between two magnetic pole pieces of opposite polarity and, by moving between said pole pieces, converts an electromotive force induced in said coil to a straight-line mechanical force or movement. Thus, the device acts as a linear motor. Conversely, such straight-line force or movement may be converted to electromotive force, the device, thereby, serving as a generator. The magnitudes of the mechanical forces and movements as a motor, and of the electromotive forces obtained as a generator are, respectively, proportional to the electrical input and mechanical input.

The present invention has for an object to provide a motor-generator of the character hereinabove referred to.

Another object of the invention is to provide a linear motor-generator of novel magnetic design, the same embodying a permanent magnet structure having a floating solenoid type coil that operates in an annular cavity in said magnet in response either to electrical or mechanical input.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a longitudinal sectional view of a linear motor-generator according to the present invention.

FIGS. 2 and 3 are cross-sectional views taken, respectively, on the lines 2—2 and 3—3 of FIG. 1.

FIG. 4 is a perspective view of one of two pole pieces provided in the illustrated linear motor-generator.

The present linear motor-generator comprises, generally, two outer magnetic-transfer housings 5, a permanent magnet 6 disposed in each end of said housing, an inner pole piece 7 extending from each magnet 6 and in axial alignment to form a continuous cylindrical member, an outer or surrounding pole piece 8 around the inner pole piece 7 and forming therebetween an annular flux cavity 9, a coil frame beam 10, a tubular coil 11 connected to said beam and loosely disposed in the cavity 9, and combined suspension and conductor means 12 to mount the beam and coil and to provide electrical input or output, as the case may be, for the coil.

The above generally described motor is formed of similar assemblies 13 that meet along a transverse plane 14, the beam 10 and the coil 11 extending across the plane 14 partly in each assembly 13. Tie bolts 15 connect the assemblies in end-to-end relation and integrate said assemblies as a single motor unit, the following detailed description being based on such a unitary and integrated structure.

The magnetic-transfer housing 5 is shown as opposed end walls 16 which, as seen in FIG. 3, have opposite arcuate edges 17 on a curvature generated on the center of the housing, and opposite straight and parallel edges 18 connecting the ends of edges 17, and arcuate side walls 19 that extend longitudinally between the arcuate edges 17 of the opposite end walls 16. On each side of plane 14 and in flatwise engagement, are provided intermediate walls 20 similar in size and shape to the walls 16. The walls 16 have an overlapping engagement with the ends of walls 19 so that nuts or heads 21 on the ends of bolts 15, by drawing walls 16 toward each other, hold the housing members 16, 19 and 20 in assembly. The walls 20 are in half-lap engagement with the walls 19 so that the same are securely held on the plane 14, as shown.

On a diametral plane through the mentioned center of the motor and at an angle of about 19° to the edges 18 of the walls 16, the walls 20 are divided by a slot 22, the ends of said slot joining longitudinal slots 23 that extend from the plane 14 partly toward the end walls 16. Said 19° angle is chosen because the complement of said angle is the best angle at which a ball point pen will mark a surface 24 that is parallel to the edges 18 of the housing 5. As will later be seen, the beam 10 mounts a pen 25 at 71° to said surface 24 for proper marking of said surface during operation of the device as a linear motor.

The permanent magnets 6 are shown as circular slugs that are secured to the inner surfaces of end walls 16 on the axial center of the housing 5. Since the walls 16, 19 and 20 are of magnetizable material, said permanent magnets 6 maintain the polarity of the pole pieces 7 and 8 by being disposed in a closed magnetic loop at each end of the coaxial pole pieces.

Each inner pole piece 7 is formed of an extension of each respective magnet 6, the same being axially aligned and meeting at the plane 14. Each pole piece 7 is shown with a hollow or cavity 26 although the same may be omitted, if desired. Said pole pieces 7 are provided with longitudinal slots 27 coplanar with the slots 22 and of the same width as said slots 22 and the slots 23 extending therefrom.

Each outer pole piece 8 is shown as a tubular extension of the respective intermediate walls 20, the slots 22 of said walls 20 joining longitudinal slots 28 to be coplanar with and having the same width as the slots 22, 23 and 27. Since the inner and outer pole pieces 7 and 8, respectively, are concentric, the flux cavity or gap therebetween is annularly uniform throughout the longitudinal coextension of said pole pieces.

In the above-described assemblage of transfer housing, permanent magnets and pole pieces, the pole pieces 7 and 8 are of opposite polarity, the same being determined and maintained by the polarity of the permanent magnets 6.

The coil frame beam 10 comprises a thin metal or sheet metal member that has a thickness substantially thinner than the width of the mentioned slots. Thus, the same fits said slots with ample mechanical clearance, as may best be seen in FIG. 2. Said beam is formed to have a pen-holding end 29 that extends outward of one side of housing 5 and is adapted to hold the pen 25. A similar extension 30 may be provided at the opposite side of the housing, if a pointer end or index is desired. Said beam is formed with a central, substantially rectangular opening 31 of a width substantially the same as the inner diameter of the outer pole piece 8.

The coil 11 is fitted into said beam opening 31 to the full length of said opening, the same having a thickness to loosely or freely fit the annular flux cavity 9 so that the same with the beam 10 thereon is free to move both under electrical and mechanical input, as above indicated.

Said coil may be formed of convolutions of fine wire embedded in and completely enclosed in epoxy resin that renders the coil rigid and the convolutions thereof relatively fixed as wound. Said coil may be wound with single or multi layers, as desired, may have end leads for current conduction and as many intermediate leads or taps as may be needed for specialized conditions or purposes. Such a coil does not need a form on which to be wound but a form may be used or omitted, as space requirements dictate. Intermediate leads or taps may be brought out from the coil singly or tied in multiples, as required for single or multiple inputs or outputs.

The means 12 comprises a complement of elongated coil springs 32 that extend longitudinally from the opposite ends of the beam 10 through openings 33 in the end walls 16 and connect to terminals 34 that are mounted on dielectric blocks 35 affixed to the outsides of said end walls 16. By placing said springs 32 under light tension and arranged to have their opposed pull equal at opposite ends, said springs resiliently mount the beam 10 and coil 11 carried thereby so the latter may be moved either electrically due to flux variations in the cavity 9, or mechanically due to push or pull on either end 29 or 30.

The mentioned coil ends and taps may be brought to the springs 32 so that the latter may serve to bring current to or receive current impulses from the coil 11 by way of terminals 34.

As indicated in FIG. 1, if each slug 6 has a permanent outer S and an inner N polarity, the magnetic-transfer housing 5 will cause the outer pole pieces 8 to have S polarity and the inner pole pieces 7 to have N polarity. Thus, the coil 11, in the manner of a moving solenoid coil, cuts across a flux field in cavity 9 that flows according to such indicated singular polarity.

In the present motor, the coil 11 constitutes a computer or calculator and, in the usual way, may be wound accordingly. Said coil has a zero or center position, when unexcited, and moves in one or both longitudinal directions to infinity according to the force of electrical excitement or mechanical displacement imposed on said coil.

It will be clear from the foregoing that the pole pieces 7 and 8 may be designed and proportioned, and the cavity 9 sized, to provide an equal and symmetrical magnetic flux distribution throughout the effective, coextensive length thereof, as required by the maximum excursion or movement of the coil, for the purpose of producing a linear indication on a straight-line indicator (note frame end 30), or to produce a graphic record, as by means of pen 25.

Evenly diminishing flux density from the outer end of the poles adjacent to the magnet slugs 6 may be achieved by the present design. Also, logarithmic diminishing or increasing flux density from the pole ends toward the plane 14 may be achieved within cavity 9 (note the form of cavity 26).

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A linear motor-generator comprising a permanent magnet, an inner pole piece extending from one pole of said magnet, a magnetic-transfer housing connected to and partly enclosing said magnet and inner pole piece, an outer pole piece carried by and within the magnetic-transfer housing around and partly coextensive with the inner pole piece, the inner pole piece being of similar polarity to the pole of the magnet from which it extends, the outer pole piece being of opposite polarity to the inner pole piece, said two pole pieces defining an elongated and annular flux cavity therebetween, and a free, movable coil in said cavity.

2. A linear motor-generator comprising a permanent magnet, an inner pole piece extending from one pole of said magnet, a magnetic-transfer housing connected to and partly enclosing said magnet and inner pole piece, an outer pole piece carried by and within the magnetic-transfer housing around and partly coextensive with the inner pole piece, the inner pole piece being of similar polarity to the pole of the magnet from which it extends, the outer pole piece being of opposite polarity to the inner pole piece, said two pole pieces defining an elongated and annular flux cavity therebetween, a free, movable coil in said cavity, said housing and pole pieces being on a common axis and having a slot therein extending through said axis, and a coil frame beam disposed in said slot and mounting said coil.

3. A linear motor-generator comprising a permanent magnet, an inner pole piece extending from one pole of said magnet, a magnetic-transfer housing connected to and partly enclosing said magnet and inner pole piece, an outer pole piece carried by and within the magnetic-transfer housing around and partly coextensive with the inner pole piece, the inner pole piece being of similar polarity to the pole of the magnet from which it extends, the outer pole piece being of opposite polarity to the inner pole piece, said two pole pieces defining an elongated and annular flux cavity therebetween, a free, movable coil in said cavity, said housing and pole pieces being on a common axis and having a slot therein extending through said axis, a coil frame beam disposed in said slot and mounting said coil, and a resilient mount for said beam and constituting electric conductors between said coil and a source of current.

4. A linear motor-generator according to claim 3 in which the magnetic-transfer housing and the two pole pieces comprise two end abutted assemblies, and bolts connecting said assemblies to confine the coil and the coil frame beam within the housing.

5. In a linear motor-generator, two coaxial pole pieces of opposite polarity one within the other with an annular flux cavity therebetween, a permanent magnet at one end of the inner pole piece with one pole of said magnet providing said inner pole piece with similar polarity, a magnetic-transfer housing mounting the outer pole piece at one of its ends and mounting said magnet at the other of its ends and transferring the polarity of the other magnet pole to the outer pole piece to provide the same with a polarity opposite to the polarity of the inner pole piece, a solenoid coil in said flux cavity, said pole pieces and housing having a common axial center and having a longitudinal slot that extends in a diametral plane through said center, and a coil frame beam disposed in said slot and carrying said solenoid coil.

6. In a linear motor-generator according to claim 5, resilient members mounting the coil frame beam within the housing.

7. In a linear motor-generator according to claim 5, resilient members mounting the coil frame beam within the housing, and electrical terminals carried by said housing and connected to said resilient members, the coil having leads in electrical connection with the latter members.

8. A linear motor-generator comprising first and second magnetic-transfer housings each having first and second opposed end walls, said first end walls each separately supporting permanent magnets, said magnets supporting axially aligned inner pole pieces, said second end walls being joined in abutting relation and supporting oppositely extending annular outer pole pieces defining an air-gap with respect to said inner pole pieces, said housings having a common axis and having a slot therein extending into each housing, a coil frame disposed in said slot, and a coil supported in said air-gap by said coil frame.

References Cited in the file of this patent
UNITED STATES PATENTS

| | | |
|---|---|---|
| 2,633,020 | Abbott | Mar. 31, 1953 |
| 2,778,882 | Pontzen et al. | Jan. 22, 1957 |